(12) United States Patent
Andrews et al.

(10) Patent No.: US 7,040,464 B1
(45) Date of Patent: May 9, 2006

(54) BRAKE SHOE ASSEMBLY AND DISC BRAKE ASSEMBLY INCLUDING SUCH A BRAKE SHOE ASSEMBLY

(75) Inventors: Kelly Andrews, Canton, MI (US); Scott Franz, Clawson, MI (US); Jonathan Wemple, Royal Oak, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 11/084,075

(22) Filed: Mar. 18, 2005

(51) Int. Cl.
*F16D 65/40* (2006.01)

(52) U.S. Cl. .................... 188/73.38; 188/73.39

(58) Field of Classification Search ............. 188/73.38, 188/73.39, 72.3, 1.11 W, 73.35, 73.37
See application file for complete search history.

(56) References Cited

U.S. PATENT DOCUMENTS 5,025,897 A * 6/1991 Hirashita et al. ........ 188/73.38
5,687,817 A * 11/1997 Kobayashi et al. ........ 188/72.3
6,719,105 B1 * 4/2004 Wemple ................. 188/73.38

* cited by examiner

*Primary Examiner*—Melanie Torres

(74) *Attorney, Agent, or Firm*—MacMillan, Sobanski & Todd, LLC

(57) ABSTRACT

This invention relates to an improved brake shoe assembly and a disc brake assembly including such a brake shoe assembly. The disc brake assembly includes an anchor bracket adapted to be secured to a vehicle component; a brake caliper adapted to be secured to the anchor bracket; an inboard brake shoe and an outboard brake shoe carried by the disc brake assembly and adapted to be disposed on opposite axial sides of an associated brake rotor, each of the brake shoes including a pair of opposed ends; actuation means for selectively moving the shoes into frictional engagement with the rotor; and a first clip carried by at least one of the opposed ends of one of the brake shoes to thereby urge the one of the brake shoes against a trailing end of the anchor bracket to prevent caliper rotation when the disc brake assembly is actuated.

20 Claims, 10 Drawing Sheets

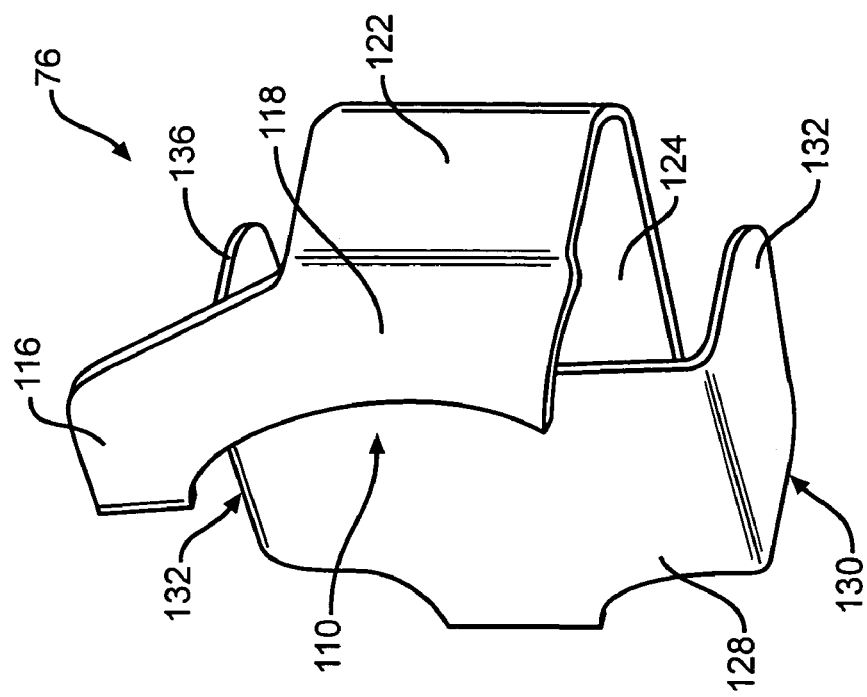
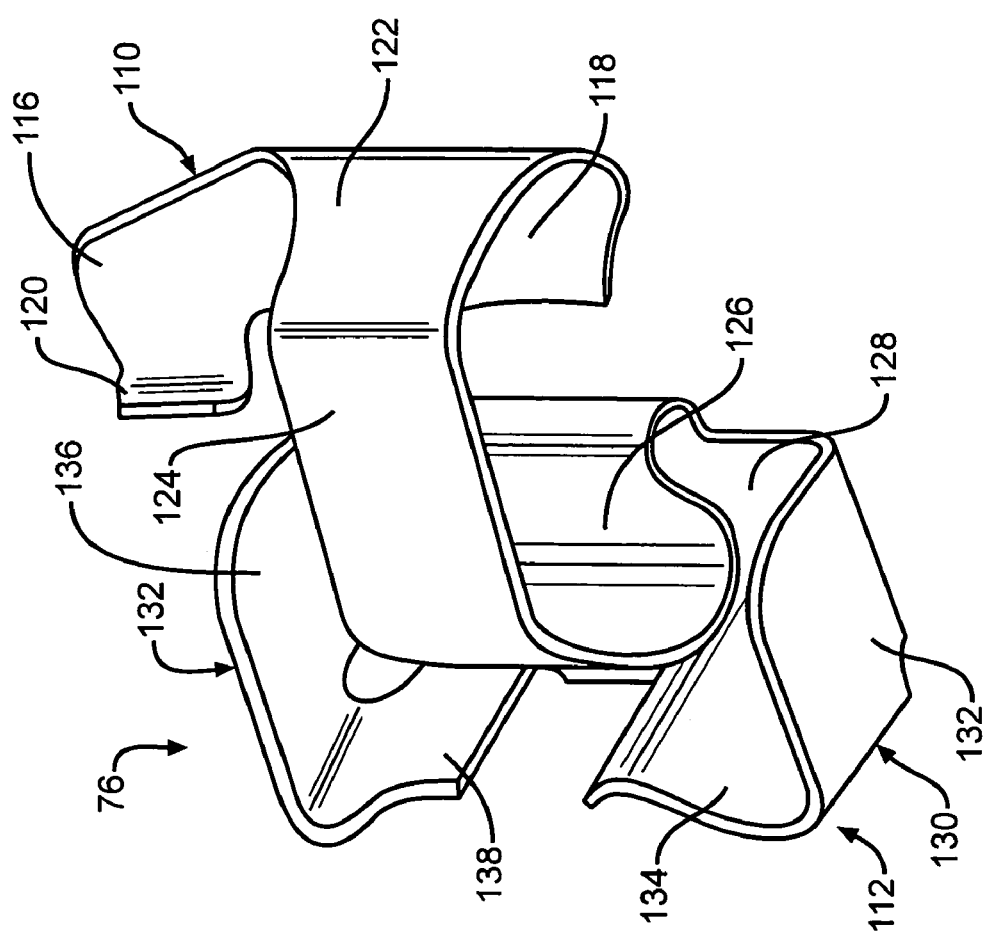

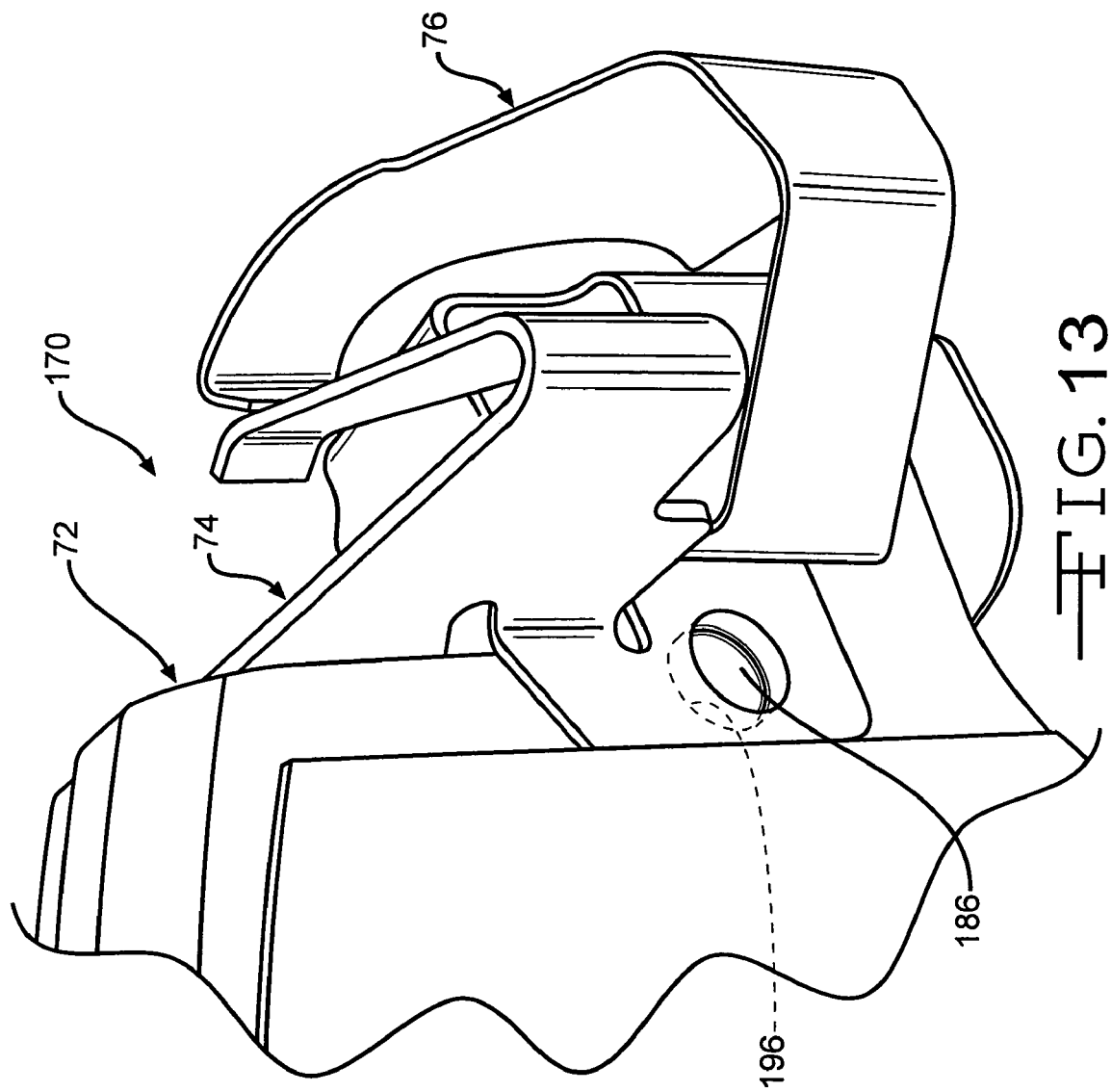

BRAKE SHOE ASSEMBLY AND DISC BRAKE ASSEMBLY INCLUDING SUCH A BRAKE SHOE ASSEMBLY

CROSS-REFERENCE TO RELATED APPLICATIONS

This application is related to U.S. Ser. No. 10/811,076, filed Mar. 26, 2004, which is a continuation of PCT/US02/30539, filed Sep. 25, 2002, which claims the benefit of U.S. Provisional Application Ser. No. 60/324,705, filed Sep. 25, 2001.

BACKGROUND OF THE INVENTION

This invention relates in general to vehicle disc brake assemblies and in particular to an improved structure for a brake shoe assembly adapted for use in such a vehicle disc brake assembly.

Most vehicles are equipped with a brake system for retarding or stopping movement of the vehicle in a controlled manner. A typical brake system for an automobile or light truck includes a disc brake assembly for each of the front wheels and either a drum brake assembly or a disc brake assembly for each of the rear wheels. The brake assemblies are typically actuated by hydraulic or pneumatic pressure generated when an operator of the vehicle depresses a brake pedal. The structures of these drum brake assemblies and disc brake assemblies, as well as the actuators therefore are well known in the art.

A typical disc brake assembly includes an anchor bracket which is secured to a fixed, non-rotatable component of the vehicle. A pair of brake shoes are supported on the anchor bracket for sliding movement relative thereto. The brake shoes have respective friction pads which are disposed on opposite sides of a brake disc. The disc, in turn, is connected to the wheel of the vehicle for rotation therewith. To effect braking action, the brake shoes are moved inwardly toward one another so as to frictionally engage the opposed sides of the disc. Such frictional engagement causes retarding or stopping of the rotational movement of the disc and, therefore, the wheel of the vehicle in a controlled manner.

To accomplish this, the disc brake assembly further includes a caliper assembly for selectively moving the brake shoes into frictional engagement with the brake disc. The caliper assembly typically includes guide pins or other components to slidably support a caliper housing relative to the fixed anchor bracket. The caliper housing is generally C-shaped, having an inboard leg disposed adjacent the inboard brake shoe and an outboard leg disposed adjacent to the outboard brake shoe. One or more hydraulically or pneumatically actuated pistons are provided in respective cylindrical recesses formed in the caliper inboard leg adjacent to the inboard brake shoe. When the brake pedal is depressed, the piston and the inboard leg of the caliper are urged apart from one another. Specifically, the piston is urged outwardly, while the outboard leg of the caliper is urged inwardly. As mentioned above, the piston is disposed adjacent to the inboard brake shoe and, therefore, urges it outwardly toward the inner side of the disc. Because the caliper is slidably mounted on the pins of the anchor bracket, the caliper outboard leg (and, thus, the outboard brake shoe disposed adjacent thereto) are urged inwardly toward the outer side of the disc. As result, the brake shoes frictionally engage the opposed sides of the disc.

Prior art FIGS. 1 and 2 illustrate a portion of a prior art vehicle disc brake assembly, indicated generally at 10. The general structure and operation of the prior art disc brake assembly 10 is conventional in the art. Thus, only those portions of the prior art disc brake assembly 10 which are necessary for a full understanding of this invention will be explained and illustrated.

As shown in prior art FIG. 1, the disc brake assembly 10 is a sliding type of disc brake assembly and includes a generally C-shaped caliper, indicated generally at 12. The caliper 12 includes an inboard leg portion 14 and an outboard leg portion 16 which are interconnected by an intermediate bridge portion 18. The caliper 12 is slidably supported on a pair of pins 20 secured to an anchor bracket, indicated generally at 22. The anchor bracket 22 is, in turn, secured to a stationary component of the vehicle. Such a stationary component can be, for example, an axle flange (not shown), when the disc brake assembly 10 is installed for use on the rear of the vehicle, or a steering knuckle (not shown), when the disc brake assembly 10 is installed for use on the front of the vehicle.

The pins 20 extend through non-threaded apertures 14A formed in the inboard leg 14 of the caliper 12. The pins 20 have respective threaded ends 20A which are received in threaded apertures 22A provided in anchor bracket 22. The pins 20 support the caliper 12 for sliding movement relative to the anchor bracket 22 in both the outboard direction and the inboard direction. Such sliding movement of the caliper 12 occurs when the disc brake assembly 10 is actuated, as will be explained below. A pair of bolts (not shown) extend through a pair of non-threaded apertures 22B formed in the anchor bracket 22 to secure the anchor bracket 22 to the stationary vehicle component. Alternatively, other known securing methods can be used to secure the anchor bracket 22 to the stationary vehicle component.

As best shown in prior art FIG. 2, the anchor bracket 22 includes a pair of axially and outwardly extending arms 24 and 26 which are interconnected at their inboard ends by an inner tie bar 28. The arms 24 and 26 have upstanding guide rails 24A and 26A, respectively formed thereon. The guide rails 24A and 26A extend transverse to the arms 24 and 26, respectively, and parallel to one another. The guide rails 24A and 26A slidably support an inboard brake shoe, indicated generally at 30, and an outboard brake shoe, indicated generally at 32, respectively.

The inboard brake shoe 30 includes a backing plate 34 and a friction pad 36. The inboard backing plate 34 includes opposed ends having notches 34A and 34B formed therein, for supporting the inboard brake shoe 30 on the guide rails 24A and 26A of the anchor bracket 22. The outboard brake shoe 32 includes a backing plate 38 and a friction pad 40. The outboard backing plate 38 includes opposed ends having notches 38A and 38B formed therein, for supporting the outboard brake shoe 32 on the guide rails 24A and 26A of the anchor bracket 22. Alternatively, the inboard brake shoe 30 can be supported on a brake piston of the prior art disc brake assembly 10, while the outboard brake shoe 32 can be supported on the outboard leg portion 16 of the caliper 12.

An actuation means (not shown) is provided for effecting the operation of the disc brake assembly 10. The actuation means includes a brake piston (not shown) which is disposed in a counterbore or recess 14B formed in the outboard surface of the inboard leg 14 of the caliper 12. The actuation means can be hydraulic, electrical, pneumatic, and mechanical types.

The prior art disc brake assembly 10 further includes a brake rotor 42, which is connected to a wheel (not shown) of the vehicle for rotation therewith. The illustrated brake rotor 42 includes a pair of opposed friction discs 44 and 46 which are spaced apart from one another by a plurality of intermediate fins or posts 48 in a known manner to produce a "vented" or "ventilated" brake rotor. The brake rotor 42 extends radially outwardly between the inboard friction pad 30 and the outboard friction pad 32.

When it is desired to actuate the prior art disc brake assembly 10 to retard or stop the rotation of the brake rotor 42 and the vehicle wheel associated therewith, the driver of the vehicle depresses the brake pedal (not shown). In a hydraulically actuated system which is well known in the art, the depression of the brake pedal causes pressurized hydraulic fluid to urge the piston into engagement with the backing plate 34 of the inboard brake shoe 30. As a result, the friction pad 36 of the inboard brake shoe 30 is moved into frictional engagement with the inboard friction disc 44 of the brake rotor 42. At the same time, the caliper 12 slides on the pins 20 such that the outboard leg 16 thereof moves the friction pad 40 of the outboard brake shoe 32 into frictional engagement with the outboard friction disc 46 of the brake rotor 42. As a result, the opposed friction discs 44 and 46 of the brake rotor 42 are frictionally engaged by the respective friction pads 36 and 40 to slow or stop relative rotational movement thereof.

SUMMARY OF THE INVENTION

This invention relates to an improved brake shoe assembly and a disc brake assembly including such a brake shoe assembly. The disc brake assembly includes an anchor bracket adapted to be secured to a vehicle component; a brake caliper adapted to be secured to the anchor bracket; an inboard brake shoe and an outboard brake shoe carried by the disc brake assembly and adapted to be disposed on opposite axial sides of an associated brake rotor, each of the brake shoes including a pair of opposed ends; actuation means for selectively moving the shoes into frictional engagement with the rotor; and a first clip carried by at least one of the opposed ends of one of the brake shoes to thereby urge the one of the brake shoes against a trailing end of the anchor bracket to prevent caliper rotation when the disc brake assembly is actuated.

Other advantages of this invention will become apparent to those skilled in the art from the following detailed description of the preferred embodiments, when read in light of the accompanying drawings.

BRIEF DESCRIPTION OF THE DRAWINGS

FIG. 9 is a view of the second clip illustrated in FIGS. 3–6.

FIG. 10 is another view of the second clip.

FIG. 13 is a view similar to FIG. 5 showing a portion of a second embodiment of a brake shoe assembly according to the present invention.

DETAILED DESCRIPTION OF THE PREFERRED EMBODIMENTS

Figure 1:
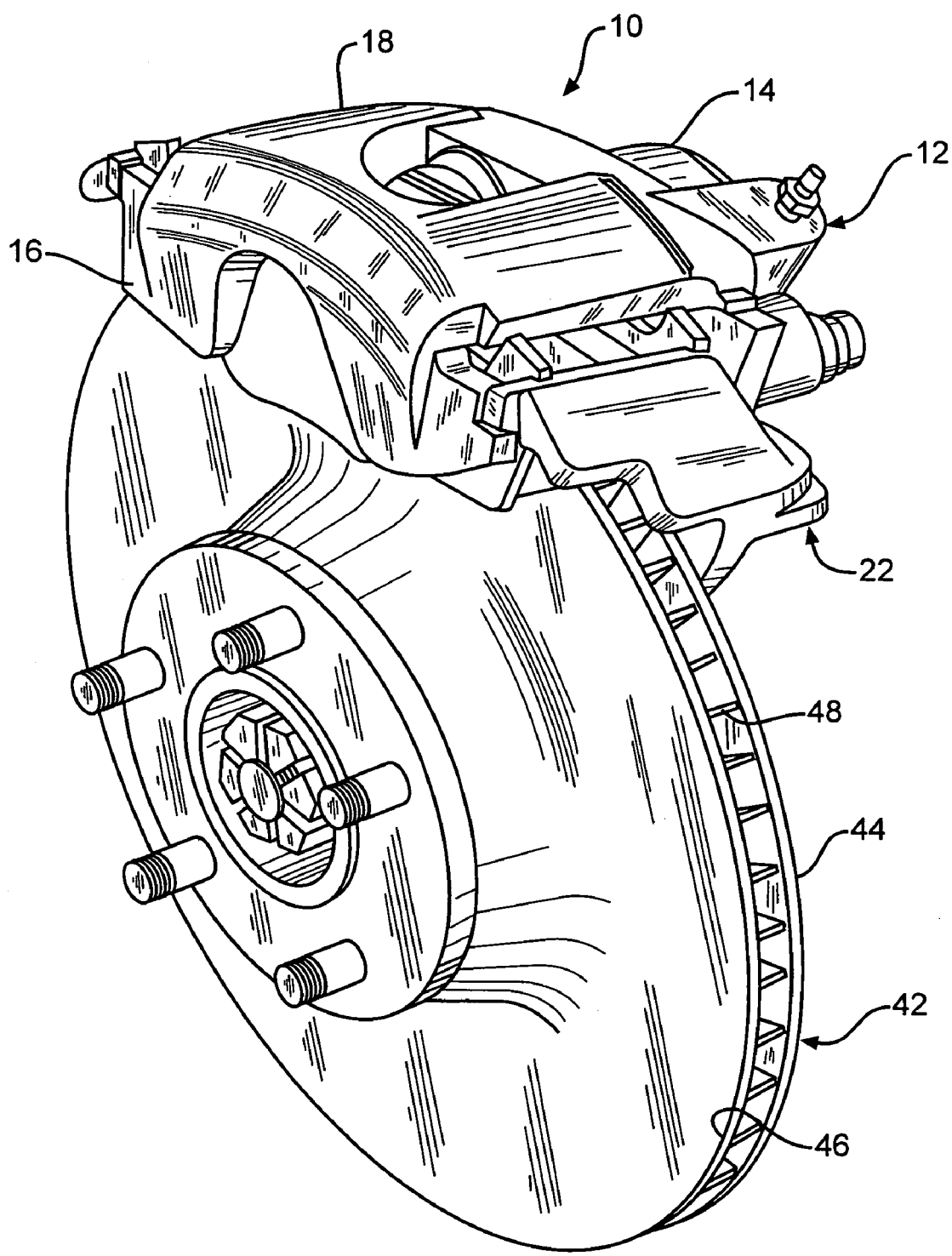
FIG. 1 is a perspective view of a portion of a prior art vehicle disc brake assembly.
Figure 2:
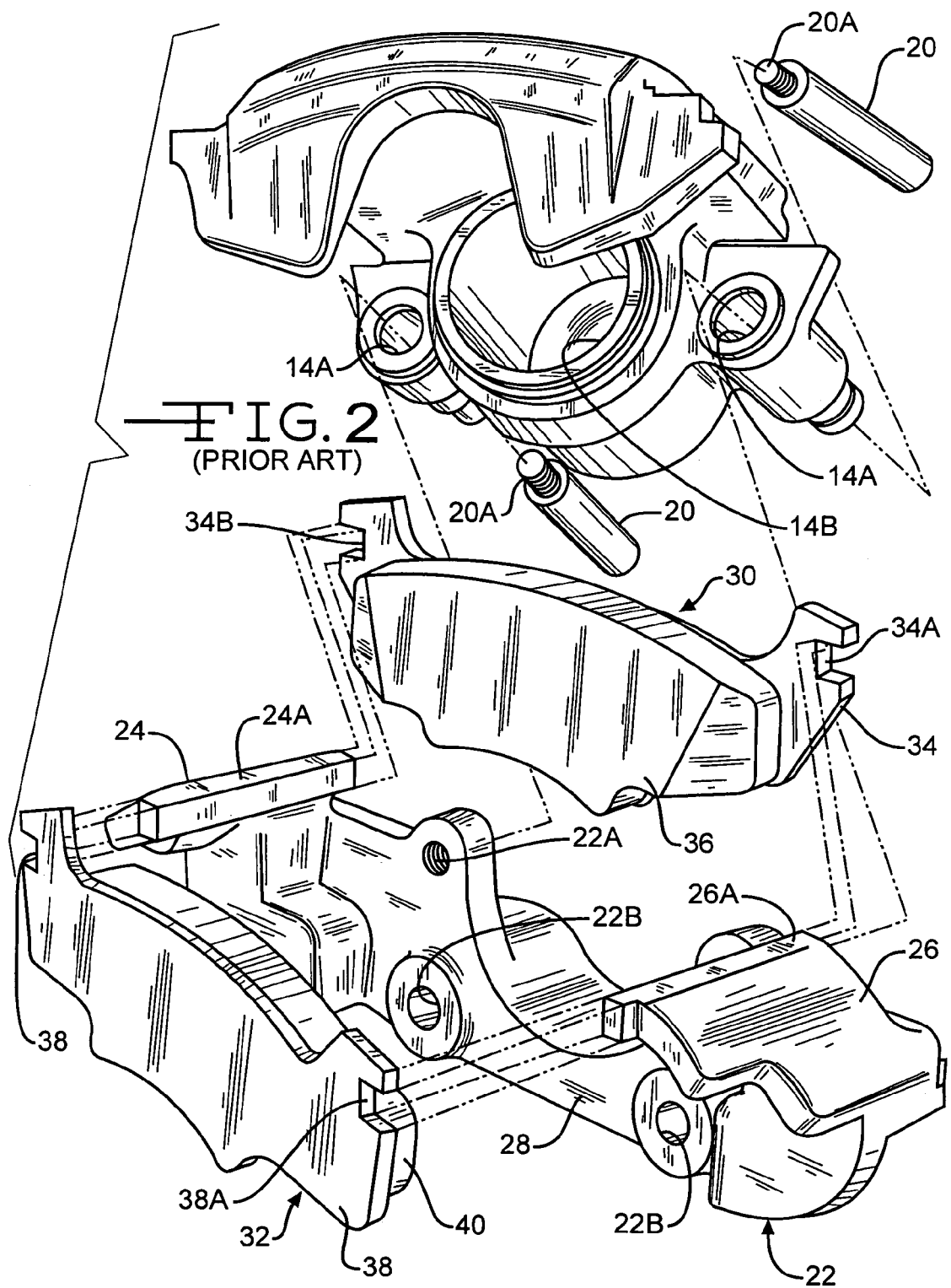
FIG. 2 is an exploded perspective view of selected components of the prior art vehicle disc brake assembly illustrated in FIG. 2.
Figure 3:
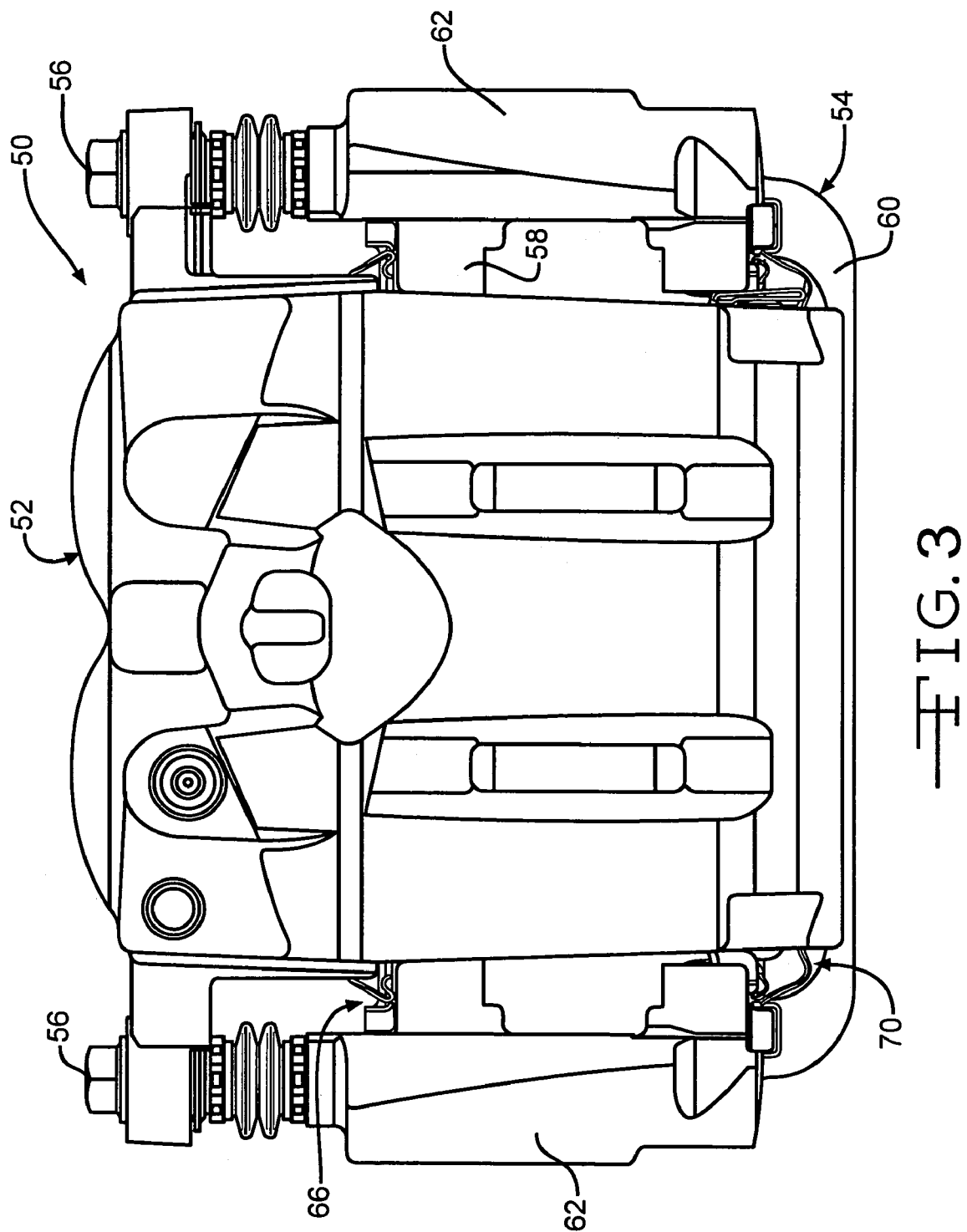
FIG. 3 is a top view of a portion of a disc brake assembly including a first embodiment of a brake shoe assembly according to the present invention.
Figure 4:
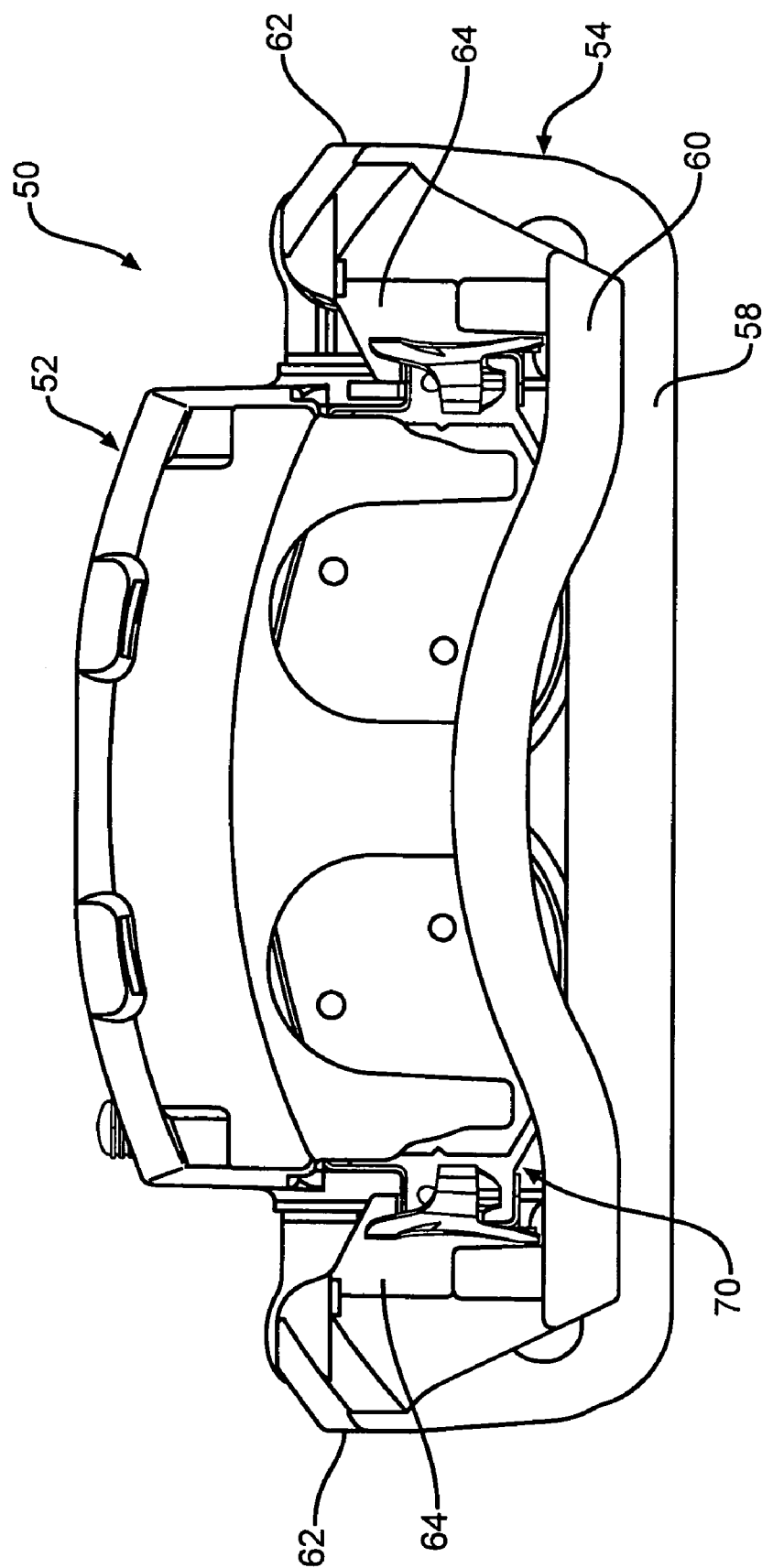
FIG. 4 is an outboard view of the disc brake assembly illustrated in FIG. 3.

Referring now to the drawings, there is illustrated in FIGS. 3 and 4 a portion of a disc brake assembly, indicated generally at 50, including a first embodiment of an outboard brake shoe assembly, indicated generally at 70, according to the present invention. The general structure and operation of the disc brake assembly 50 is conventional in the art and is generally similar to that described above in connection with prior art FIGS. 1 and 2. Thus, only those portions of the disc brake assembly 50 which are necessary for a full understanding of this invention will be explained and illustrated. Although this invention will be described and illustrated in connection with the particular kind of vehicle disc brake assembly 50 disclosed herein, it will be appreciated that this invention may be used in connection with other kinds of disc brake assemblies if so desired. For example, the invention can be used in conjunction with other single piston, twin piston, single opposed piston and twin opposed piston disc brake assemblies.

Briefly, as shown in FIGS. 3 and 4, the disc brake assembly 50 includes a twin piston caliper 52 and an anchor bracket or abutment 54. Pins 56 extend through apertures (not shown) formed in the caliper 52 and have ends which are received in apertures provided in anchor bracket 54 to support the caliper 52 for sliding movement relative to the anchor bracket 54.

In the illustrated embodiment, the anchor bracket 54 includes an inner tie bar 58, an outer tie bar 60, and a pair of arms 62 extending therebetween. The arms 62 have guide rails 64 formed thereon. Each of the guide rails 64 is provided with notch or recess (not shown) formed therein to support the outboard brake shoe assembly 70 and an inboard brake shoe assembly 66. Alternatively, the structure of the disc brake assembly 50, including the structure of the caliper 52 and/or the anchor bracket 54, can be other than illustrated and described if so desired.

Figure 5:
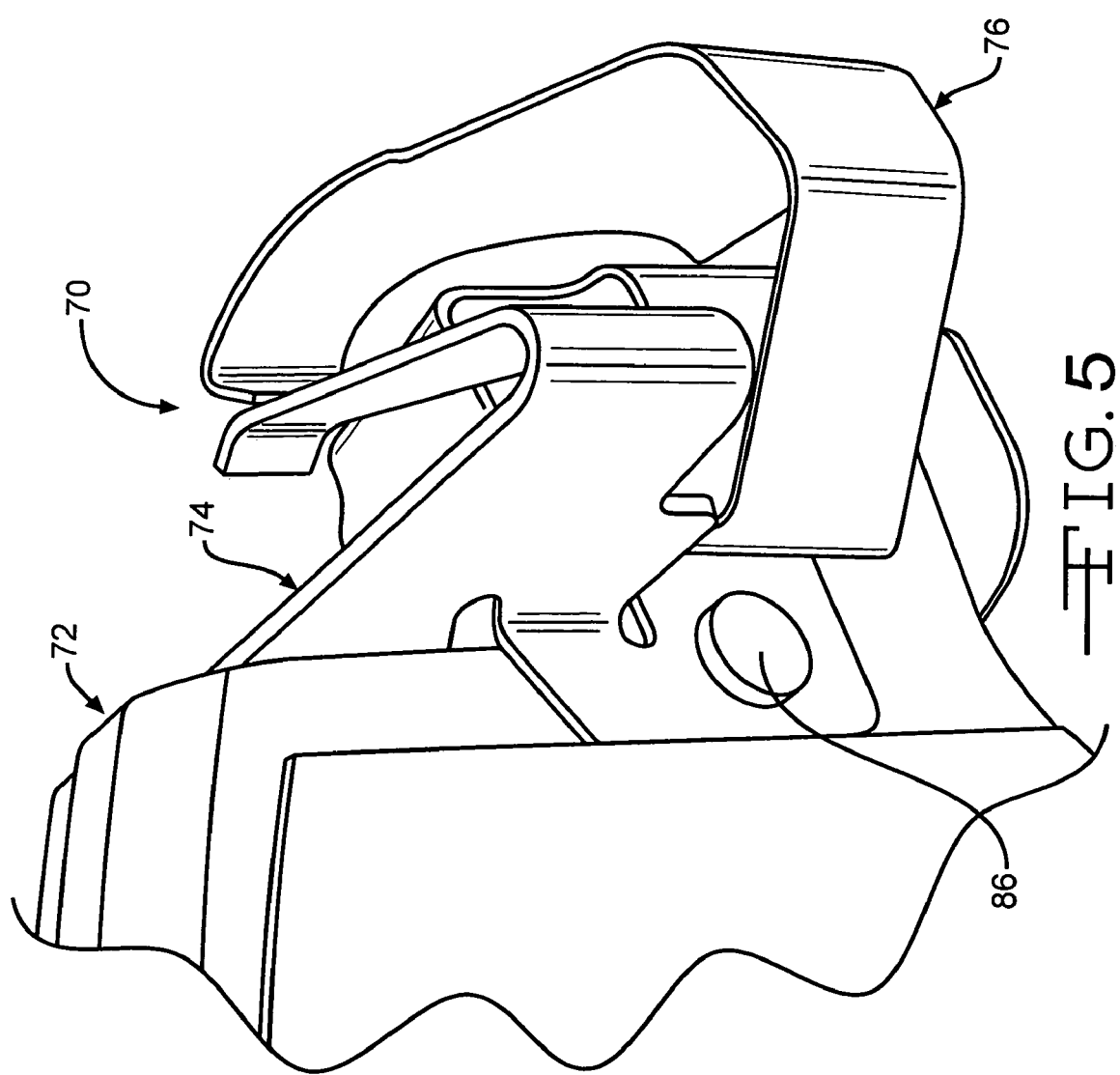
FIG. 5 is a perspective view of a portion of the brake shoe assembly illustrated in FIGS. 3 and 4 with the assembly having the first clip and the second clip installed thereon according to the present invention.
Figure 6:
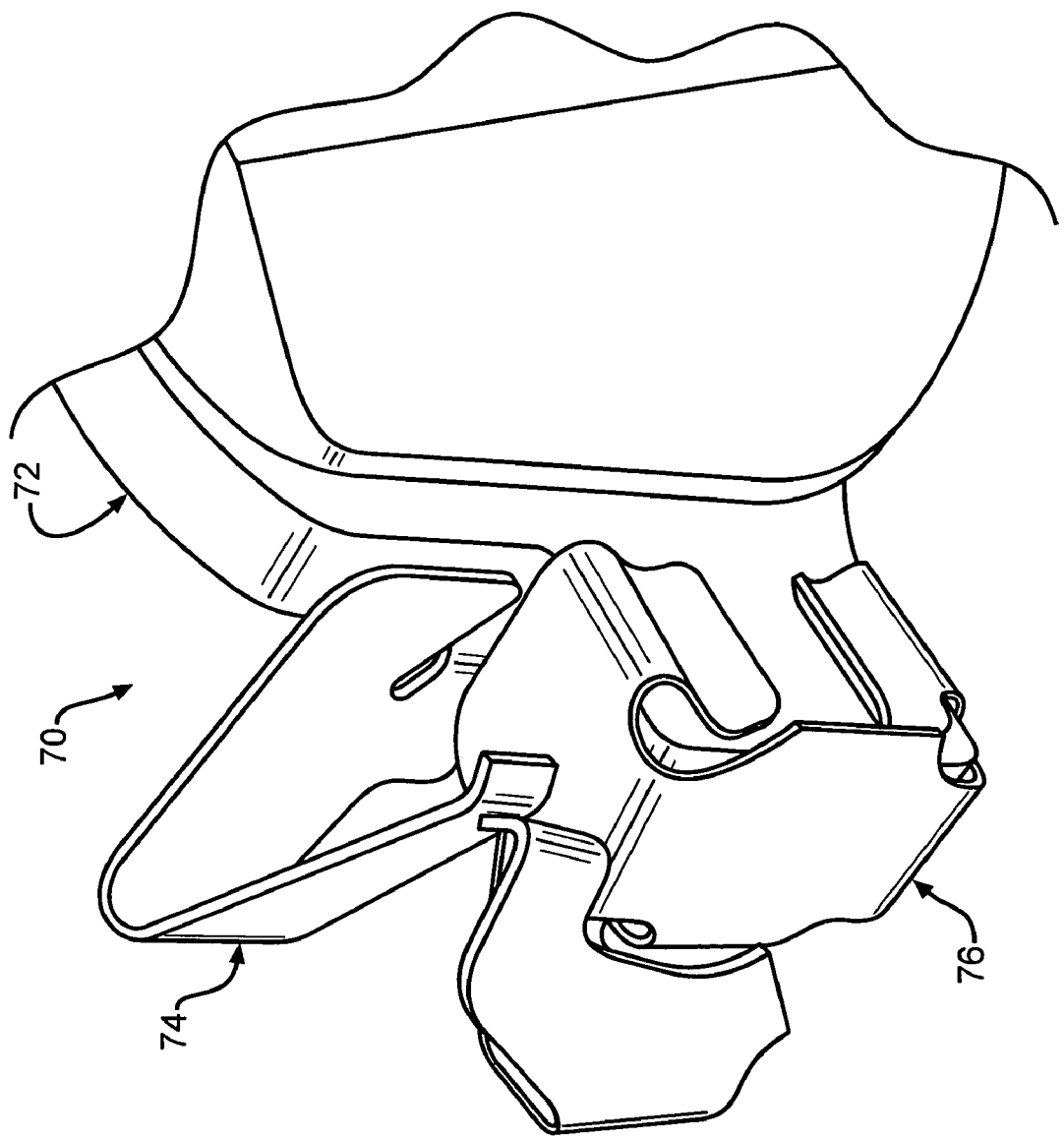
FIG. 6 is another perspective view of a portion of the brake shoe assembly illustrated in FIGS. 3 and 4 with the assembly having the first clip and the second clip installed thereon.
Figure 12:
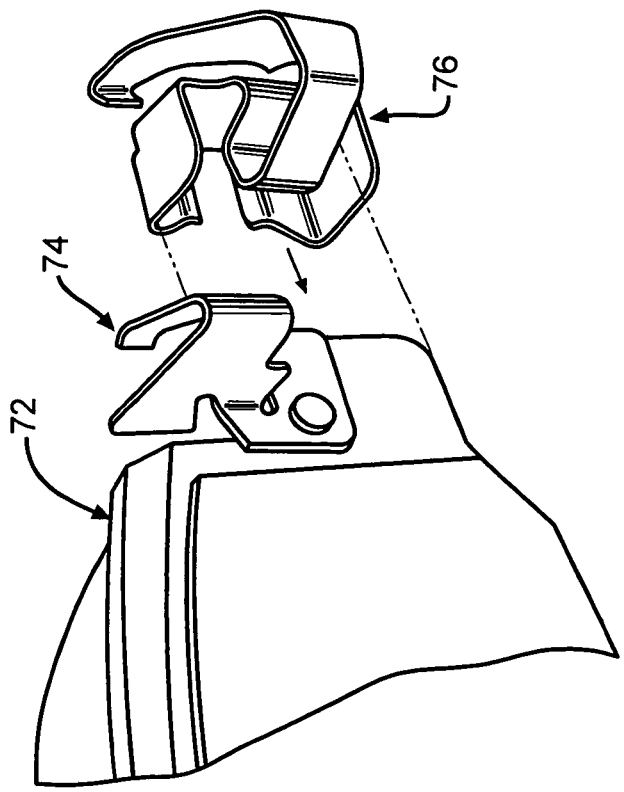
FIG. 12 is another exploded perspective view of a portion of the brake shoe assembly illustrated in FIGS. 3–6 with the assembly having the first clip and the second clip installed thereon.
Figure 11:
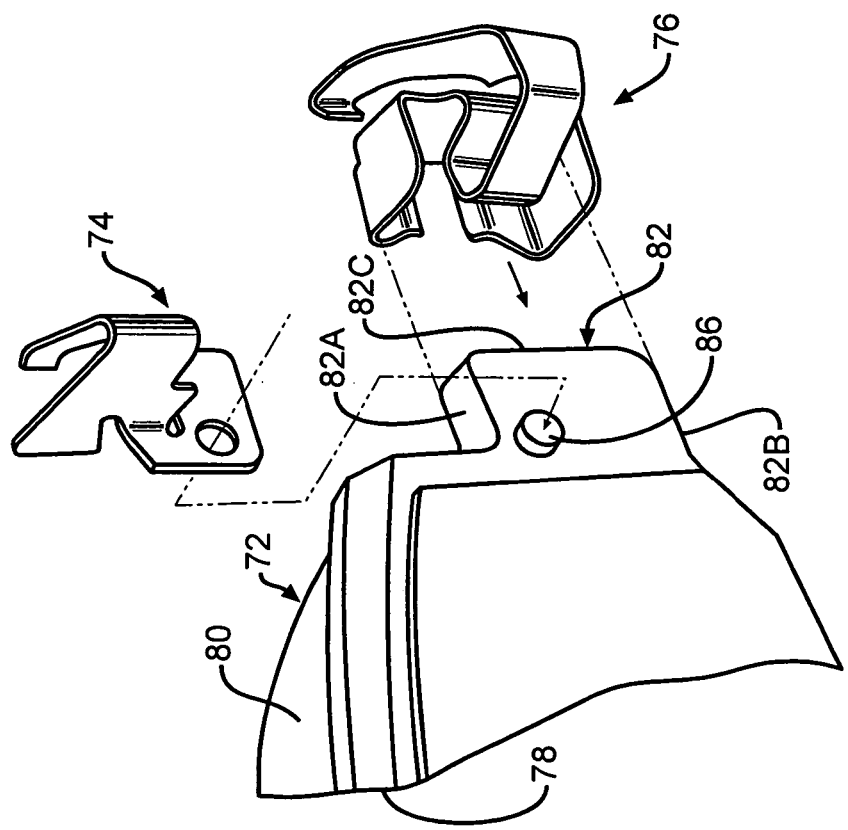
FIG. 11 is an exploded perspective view of a portion of the brake shoe assembly illustrated in FIGS. 3–6 with the assembly having the first clip installed thereon.

Turning now to FIGS. 5 and 6, the first embodiment of the brake shoe assembly 70 will be discussed. As shown therein, the brake shoe assembly 70 includes a brake shoe 72, a first or inner bias spring clip 74 and a second or outer retractor spring clip 76. As best shown in FIGS. 11 and 12, the brake shoe 72 is generally flat and arcuate and includes a backing plate 78 and a friction pad 80 secured thereto. The backing plate 78 is formed from a suitable material by a suitable process, such as for example, from steel by a stamping process. The friction pad 80 is typically secured to the backing plate 78 by a suitable process, such as bonding and/or riveting.

The backing plate 78 includes opposed ends (only one of such ends being illustrated) having a tab or protrusion 82 formed thereon. Preferably, the tab 82 on each of the ends of the backing plate 78 is identical to one another. The tab 82 includes a top or first edge 82A, a lower or second edge 82B and a side or third edge 82C. The top edge 82A and the lower edge 82B are generally parallel to one another and generally perpendicular to the side edge 82C. The tabs 82 are adapted to be received in the notches provided in the guide rails 64 of the anchor bracket 54 to slidably support the pair of brake shoe 72 (and also the brake shoe 66), for sliding movement between a non-braking position, wherein the brake shoes 72 and 66 are spaced from contact from a brake rotor (not shown), and a braking position, wherein the brake shoes 72 and 66 frictionally engage the opposed brake surfaces of the brake rotor. The backing plate 78 further includes a projection 86 provided thereon. Preferably, the projection 86 is integral with the backing plate 78 and is formed by a semi-pierce operation; however, the projection 86 can be formed other than illustrated and described if so desired. Alternatively, the tabs 82 do not have to be identical to one another and/or the structure or configuration of one or both of the tabs 82 can be other than illustrated if so desired.

Figure 8:
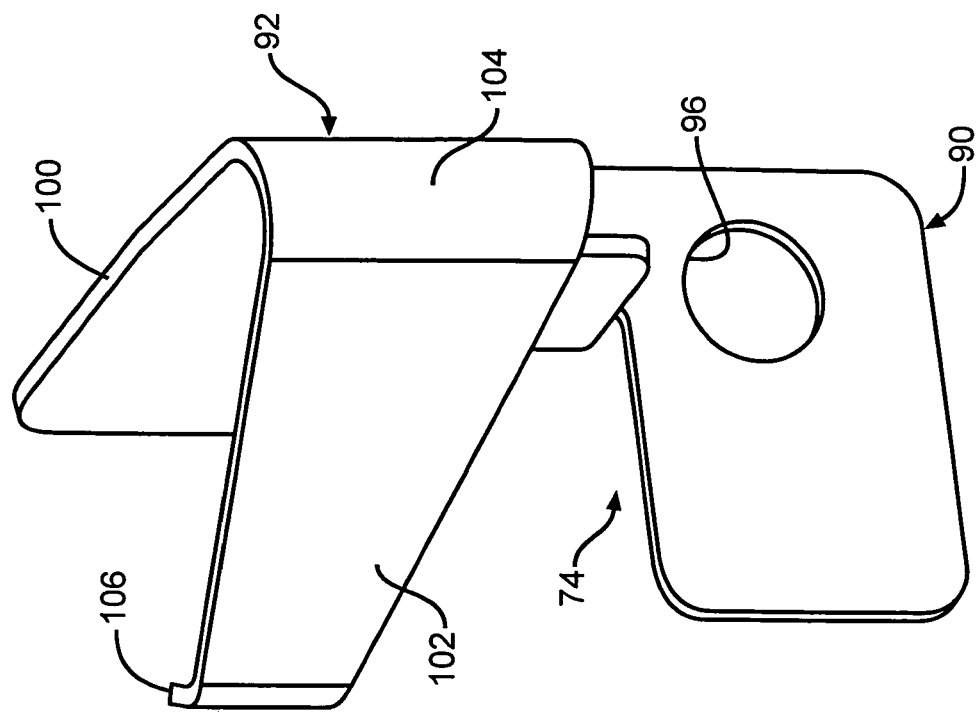
FIG. 8 is another view of the first clip.
Figure 7:
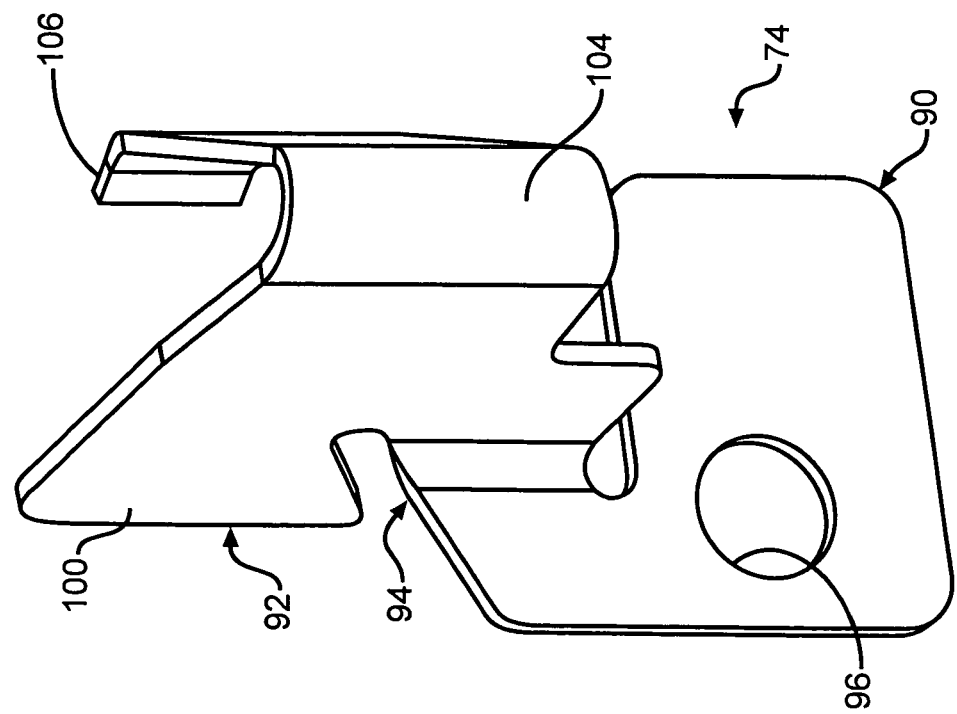
FIG. 7 is a view of the first clip illustrated in FIGS. 3–6.

Referring now to FIGS. 7 and 8, the structure of the first clip 74 will be discussed. As shown therein, the first clip 74 includes first or lower portion 90, a second or upper portion 92, and a third or intermediate portion 94 which connects the first portion 90 and the second portion 92 together. The first portion 90 is generally flat and is provided with an opening 96 formed therethrough. The opening 96 is adapted to receive an associated projection 86 (shown in FIGS. 5, 11 and 12), provided on the backing plate 78 of the brake shoe 72 to assist in positioning and securing the first clip 74 on the brake shoe 72.

The second portion 92 is generally V-shaped and includes a first leg or extension 100, a second leg or extension 102, and a third leg 104 which connects the first leg 100 and the second leg 102 together. The first leg 100 is generally flat and is located generally perpendicular with respect to the first portion 90. The second leg 102 is located at a predetermined angle with respect to the first leg 100 and includes an inwardly turned or curled remote end 106.

Preferably, as shown in the illustrated embodiment, the first clip 74 is installed only on the leading end of the outboard brake shoe 72 of the disc brake assembly 50. Alternatively, the first clip 74 could be installed on the trailing end of both of the brake shoes 72 and 66 of the disc brake assembly 50 if so desired. In operation, as best shown in FIG. 4, the legs 100, 102 and 104 of the upper portion 92 and 106 are operative to push or urge the trailing end of the brake shoe 72 against the anchor bracket 54 to keep the caliper 52 from rotating during application of the disc brake assembly. The first clip 74 is formed from a suitable material by a suitable process, such as for example from stainless steel or carbon steel by a stamping process. The first clip 74 can be coated with a protective corrosion resisting material, such as for example geomet L, polytetrafluoroethylene (PTFE) or E-coated, if so desired. Alternatively, the structure or shape of one or more of the portions 90, 92 and 94 of the first clip 74 can be other than illustrated if so desired.

Referring now to FIGS. 9 and 10, there structure of the second clip 76 will be discussed. As shown therein, the second clip 76 includes a first portion 110, which is adapted to be positioned adjacent the surface 12C of the anchor bracket 12 so as to react thereagainst, and a second portion 112, which is adapted to be operatively connected to an associated tab 82 and 84 of the backing plate 78 of the brake shoe 72 to thereby secure the first clip 74 onto the brake shoe 72. In the illustrated embodiment, the first portion 110 of the second clip 76 is generally U shaped and includes a protruding tab 116 extending from a main or center body portion 118. The tab 116 has a remote end 120 which is inwardly turned or curled.

The second clip 76 further includes a plurality of arms, in this embodiment, the spring 76 includes four arms 122, 124, 126, and 128. The arm 128 is further provided with a pair of arms 130 and 132 extending from opposed sides thereof. The arm 130 includes a generally flat side wall 132 and a partly wavy or curled remote end 134. Similarly, the arm 132 includes a generally flat side wall 136 and a partly wavy remote end 138. In this embodiment, the arms 130 and 132 are symmetrical and provide a symmetrical shoe attachment feature.

Preferably, as shown in the illustrated embodiment, the second clip 76 is installed on both ends of only the outboard brake shoe 72 of the disc brake assembly 50. Alternatively, the second clip 76 could be installed only on the trailing end of the outboard brake 70 having the first clip 74 installed thereon if so desired. In operation, as best shown in FIG. 4, the tab 116 of the first portion 110 and the arms 122, 124 and 126 are operative to apply a retraction force to move or urge the brake shoes 72 from engagement with the rotor when the brakes are released. The second clip 76 is formed from a suitable material by a suitable process, such as for example from carbon steel by a stamping process. The second clip 76 can be coated with a protective corrosion resisting material, such as for example geomet L, PTFE or E-coated, if so desired. Alternatively, the structure or shape of one or both of the portions 110 and 112 of 94 of the second clip 76 can be other than illustrated if so desired.

The arm 126 is adapted to be disposed against portion of the first portion 90 of the first clip 74 to assist in securing the first clip 74 onto the backing plate 78 of the brake shoe 72. Also, the arms 130 and 132 are adapted to be disposed over the tab 82 of the backing plate 78 and, in combination with the arms 126 and 128, cooperate to assist in securing the second clip 76 along with the first clip 74 onto the backing plate 78 of the brake shoe 72.

Referring now to FIG. 13 and using like reference numbers to indicate corresponding parts, there is illustrated a portion of a second embodiment of a brake shoe assembly, indicated generally at 170, according to the present invention. In this embodiment, the clip 74 is provided with a projection 186 formed thereon which is adapted to be disposed in an opening 196 (the opening shown in phantom in FIG. 13), provided in the backing plate 78 of the brake shoe 72.

One advantage of the present invention is that the spring clips 74 and 76 can be attached to the brake shoe without staking. As a result, less labor is required for assembly, a simplified location is presented and packaging advantages may be possible.

In accordance with the provisions of the patent statues, the principle and mode of operation of this invention have been described and illustrated in its preferred embodiments. However, it must be understood that the invention may be practiced otherwise than as specifically explained and illustrated without departing from the scope or spirit of the attached claims.

The invention claimed is:
1. A disc brake assembly comprising:
an anchor bracket adapted to be secured to a vehicle component;
a brake caliper adapted to be secured to said anchor bracket;

an inboard brake shoe and an outboard brake shoe carried by said disc brake assembly and adapted to be disposed on opposite axial sides of an associated brake rotor; each of said brake shoes including a pair of opposed;

actuation means for selectively moving said shoes into frictional engagement with the rotor; and a first clip carried by at least one of said opposed ends of one of said brake shoes to thereby urge said one of said brake shoes against a trailing end of said anchor bracket to prevent caliper rotation when said disc brake assembly is actuated;

wherein said first clip includes an opening and said at least one of said opposed ends of said one of said brake shoes is provided with a projection which extends through said opening.

2. The disc brake assembly of claim 1 wherein said first clip is carried by a leading end of said outboard brake shoe.

3. The disc brake assembly of claim 1 wherein said disc brake assembly further includes a second clip carried by said at least one of said opposed ends of said one of said brake shoes to thereby urge said brake shoes from engagement with said rotor when said disc brake assembly is released.

4. The disc brake assembly of claim 3 wherein said second clip assists in securing said first clip on said at least one of said opposed ends of said one of said brake shoes.

5. The disc brake assembly of claim 3 wherein said second clip is carried by both of said opposed ends of said outboard brake shoe.

6. The disc brake assembly of claim 1 wherein said disc brake assembly further includes a second clip carried by said at least one of said opposed ends of said one of said brake shoes, said second clip assisting in securing said first clip on said at least one of said opposed ends of said one of said brake shoes.

7. The disc brake assembly of claim 1 wherein said projection is formed by a semi-pierce operation.

8. A disc brake assembly comprising:

an anchor bracket adapted to be secured to a vehicle component;

a brake caliper adapted to be secured to said anchor bracket;

an inboard brake shoe and an outboard brake shoe carried by said disc brake assembly and adapted to be disposed on opposite axial sides of an associated brake rotor; each of said brake shoes including a pair of opposed;

actuation means for selectively moving said shoes into frictional engagement with the rotor; and a first clip carried by at least one of said opposed ends of one of said brake shoes to thereby urge said one of said brake shoes against a trailing end of said anchor bracket to prevent caliper rotation when said disc brake assembly is actuated;

wherein said first clip includes a projection and said at least one of said opposed ends of said one of said brake shoes is provided with an opening which receives said projection.

9. A brake shoe assembly adapted for use in a disc brake assembly having an anchor bracket adapted to be secured to a vehicle component and a brake caliper adapted to be secured to the anchor bracket, the brake shoe assembly comprising:

a brake shoe having a pair of opposed ends; and a first clip carried by at least one of said opposed ends of brake shoe to thereby urge said brake shoe against a trailing end of the anchor bracket to prevent caliper rotation when the disc brake assembly is actuated;

wherein said first clip includes an opening and said at least one of said opposed ends of said brake shoe is provided with a projection which extends through said opening.

10. The brake shoe assembly of claim 9 wherein said first clip is carried by a leading end of said brake shoe.

11. The brake shoe assembly of claim 9 further including a second clip carried by said at least one of said opposed ends of said brake shoe to thereby urge said brake shoes from engagement with a rotor of the disc brake assembly when the disc brake assembly is released.

12. The brake shoe assembly of claim 11 wherein said second clip assists in securing said first clip on said at least one of said opposed ends of one of said brake shoe.

13. The brake shoe assembly of claim 11 wherein said second clip is carried by both of said opposed ends of said brake shoe.

14. The brake shoe assembly of claim 9 further including a second clip carried by said at least one of said opposed ends of said brake shoe, said second clip assisting in securing said first clip on said at least one of said opposed ends of said brake shoe.

15. The brake shoe assembly of claim 9 wherein said projection is formed by a semi-pierce operation.

16. A brake shoe assembly adapted for use in a disc brake assembly having an anchor bracket adapted to be secured to a vehicle component and a brake caliper adapted to be secured to the anchor bracket, the brake shoe assembly comprising:

a brake shoe having a pair of opposed ends; and a first clip carried by at least one of said opposed ends of brake shoe to thereby urge said brake shoe against a trailing end of the anchor bracket to prevent caliper rotation when the disc brake assembly is actuated;

wherein said first clip includes a projection and said at least one of said opposed ends of said brake shoe is provided with an opening which receives said projection.

17. A brake shoe assembly comprising:

a brake shoe having a pair of opposed ends;

a first clip carried by at least one of said opposed ends of said brake shoe; and a second clip carried by said at least one of said opposed ends of said brake shoe;

wherein said second clip assists in securing said first clip on said at least one of said opposed ends of said brake shoe and wherein said first clip includes an opening and said at least one of said opposed ends of said brake shoe is provided with a projection which extends through said opening.

18. The brake shoe assembly of claim 17 wherein said second clip is carried by both of said opposed ends of said brake shoe.

19. The brake shoe assembly of claim 17 wherein said projection is formed by a semi-pierce operation.

20. A brake shoe assembly comprising:

a brake shoe having a pair of opposed ends;

a first clip carried by at least one of said opposed ends of said brake shoe; and a second clip carried by said at least one of said opposed ends of said brake shoe;

wherein said second clip assists in securing said first clip on said at least one of said opposed ends of said brake shoe and wherein said first clip includes a projection and said at least one of said opposed ends of said brake shoe is provided with an opening which receives said projection.

* * * * *